US011872533B2

(12) United States Patent
Studart et al.

(10) Patent No.: US 11,872,533 B2
(45) Date of Patent: Jan. 16, 2024

(54) DEVICE AND METHOD FOR GENERATING DROPLETS

(71) Applicant: ETH ZURICH, Zurich (CH)

(72) Inventors: André R. Studart, Zurich (CH); Alessandro Ofner, Zurich (CH); Pascal Schwendimann, Biel (CH)

(73) Assignee: ETH ZURICH, Zurich (CH)

( * ) Notice: Subject to any disclaimer, the term of this patent is extended or adjusted under 35 U.S.C. 154(b) by 545 days.

(21) Appl. No.: 16/498,002

(22) PCT Filed: Mar. 22, 2018

(86) PCT No.: PCT/EP2018/057256
§ 371 (c)(1),
(2) Date: Sep. 26, 2019

(87) PCT Pub. No.: WO2018/177868
PCT Pub. Date: Oct. 4, 2018

(65) Prior Publication Data

US 2020/0023324 A1 Jan. 23, 2020

(30) Foreign Application Priority Data

Mar. 27, 2017 (EP) .................................... 17162996

(51) Int. Cl.

| | |
|---|---|
| ***B01F 5/04*** | (2006.01) |
| ***B01F 3/08*** | (2006.01) |
| ***B01F 25/314*** | (2022.01) |
| ***B01L 3/02*** | (2006.01) |
| ***B01L 3/00*** | (2006.01) |
| ***B05B 1/14*** | (2006.01) |
| ***B01F 23/41*** | (2022.01) |
| ***B01F 33/302*** | (2022.01) |

(52) U.S. Cl.
CPC ........ *B01F 25/31425* (2022.01); *B01F 23/41* (2022.01); *B01F 33/3021* (2022.01); *B01L 3/0241* (2013.01); *B01L 3/502746* (2013.01); *B05B 1/14* (2013.01); *B01F 23/4144* (2022.01); *B01F 2215/0431* (2013.01); *B01L 2300/0861* (2013.01); *B01L 2400/02* (2013.01); *B01L 2400/086* (2013.01)

(58) Field of Classification Search
CPC .. B01L 3/0241; B01L 2300/0861; B05B 1/14; B01F 2215/0431
See application file for complete search history.

(56) References Cited

U.S. PATENT DOCUMENTS

| | | | | |
|---|---|---|---|---|
| 6,321,998 B1 * | 11/2001 | Schubert | B01F 25/23 239/8 |
| 2003/0094381 A1 * | 5/2003 | Bors | C07C 5/48 205/433 |
| 2009/0142237 A1 * | 6/2009 | Seo | B01J 19/0093 422/130 |

FOREIGN PATENT DOCUMENTS

| | | |
|---|---|---|
| DE | 19541265 | 5/1997 |
| EP | 1312411 | 5/2003 |
| EP | 1875959 | 1/2008 |
| WO | 8806941 | 9/1988 |
| WO | 9965704 | 12/1999 |
| WO | 2014186440 | 11/2014 |

OTHER PUBLICATIONS

Tan et al. ("Monodispersed microfluidic droplet generation by shear focusing microfluidic device." Sensors and Actuators B: Chemical 114.1 (2006): 350-356.). (Year: 2006).*

* cited by examiner

*Primary Examiner* — Sahana S Kaup
(74) *Attorney, Agent, or Firm* — JMB Davis Ben-David

(57) ABSTRACT

The invention relates to a device (1) for generating droplets (30) comprising a plurality of channels (20), wherein each channel (20) extends from an inlet (201) along a respective longitudinal axis (L) to an outlet (202), wherein said device (1) comprises a plurality of layers (10) of a substrate material arranged in a stack (100), wherein each layer (10) comprises a first side (101) and a second side (102) facing away from each other, and wherein said first side (101) of each layer (10) comprises a plurality of grooves (103), wherein said channels (20) are formed by said grooves (103) of said first side (101) of a respective layer (10) of said stack (100) and said second side (102) of a respective adjacent layer (10) of said stack (100). The invention further relates to a method for generating droplets (30) and a fabrication method of the device (1).

14 Claims, 5 Drawing Sheets

DEVICE AND METHOD FOR GENERATING DROPLETS

CROSS-REFERENCE TO RELATED APPLICATIONS

This is the U.S. National Stage of International Patent Application No. PCT/EP2018/057256 filed Mar. 22, 2018, which claims priority to European Patent Application No. 17162996.7 filed on Mar. 27, 2017.

The invention relates to a device and a method for generating droplets of a dispersed phase in a continuous phase, and a fabrication method of the device according to the present invention. In particular, the device is a microfluidic brush emulsifier which operates according to the principle of step emulsification, which is also referred to as microchannel emulsification or edge-based droplet generation (EDGE) emulsification.

Monodisperse droplets in the size range from micrometers to millimeters have applications in the fields of pharmaceutics, cosmetics, diagnostics, food, and material science. In an emulsion, monodispersity increases stability, allows to tightly control volumes in multiple chemical or biological reactions and enables the production of periodic structures. Microfluidics offers an exquisite platform to precisely form monodisperse droplets, however only small volumes can be produced.

Conventional microfluidic membranes according to the prior art are built out of a bulk material as starting material. As a processing step, holes are microdrilled, lasered, wet-etched or etched by deep reactive ion etching. Those methods limit the possible sizes and shapes of the final membrane, since they process the channels along its final flowing direction.

These devices of the prior art have the disadvantage that due to an inhomogeneous pressure distribution of the dispersed phase at the channel inlets, only a small percentage of the channels actively produce droplets, which significantly reduces the efficiency of emulsification. Thus, it would be desirable to increase this efficiency, in particular for large-scale industrial application of droplet generating devices.

Furthermore, an emulsification device consisting of a two-dimensional array of parallelized droplet makers (WO 2014/186440 A2) is known from the prior art. Such a microfluidic device in two dimensions limits high throughput production.

Therefore, the objective of the present invention is to provide a device and/or method for generating droplets which is improved with respect to the above-described disadvantages of the prior art, in particular a device and/or method with increased efficiency of droplet production.

This objective is attained by the subject-matter of the device according to claim 1, the method for generating droplets according to claim 12, and the fabrication method according to claim 14. Embodiments of the device are specified in the dependent claims 2 to 11, an embodiment of the method for generating droplets is specified in the dependent claim 13, and an embodiment of the fabrication method is specified in dependent claim 15. Those and other embodiments are further described in the following description.

A first aspect of the invention relates to a device for generating droplets of a dispersed phase in a continuous phase, comprising a plurality of channels, wherein each channel comprises an inlet and an outlet, and wherein each channel extends from the respective inlet along a respective longitudinal axis to the respective outlet, so that droplets of a dispersed phase can be generated in a continuous phase at the outlets when a flow of the dispersed phase from the inlets to the outlets is provided and the outlets are in flow connection with a reservoir or conduit containing the continuous phase, wherein the device comprises a plurality of layers of a substrate material arranged in a stack, wherein each layer comprises a first side and a second side, wherein the first side faces away from the second side, and wherein the first side of each layer comprises a plurality of grooves, wherein the grooves of each first side are covered by a second side of an adjacent layer, such that the plurality of channels is formed from the grooves and the second side of the adjacent layer, wherein the inlets are arranged on a front side of the stack and the outlets are arranged on an opposing back side of the stack.

That is, the grooves of a respective layer form the bottom section of the respective channels, according to a cross-section which is perpendicular to the respective longitudinal axis, and the adjacent layer on top of the respective layer forms a roof section of the channels, thereby closing the channels in the direction in which the layers are stacked. The stack may further comprise a top layer arranged at the top of the stack, wherein the first side of the top layer has a flat surface, in other words does not comprise grooves.

In particular, the grooves may be introduced into the layers by photolithography and etching.

For example, the layers are flat sheets having a rectangular cross-section.

The term 'reservoir' designates a receptacle in which a fluid phase, for example the continuous phase or the dispersed phase, is contained, and the term 'conduit' designates a receptacle in which a flow of a fluid phase for example the continuous phase or the dispersed phase, is provided.

The device according to the present invention combines precision of droplet formation through step emulsification with a sufficiently high throughput for industrial applications.

In particular, the device according to the invention can be used as a microfluidic brush emulsifier with the high ability to parallelize droplet makers in three dimensions. Stacking-up individual layers allows for the implementation of high aspect ratio channels with any desired geometry. This enables the high-throughput production of monodisperse droplets.

In the device according to the present invention, the channels are first generated, particularly etched, on multiple, individual layers. Constructing the channels from their side allows for implementing any desired aspect ratios, for example an aspect ratio of 80, wherein the channels are 20 μm wide and 1600 μm long. With this processing method, it is possible to implement channels with an aspect ratio of 10000, wherein the channels are 6 μm wide and 6 cm long. Moreover, channel geometries can simply be implemented by photolithography, allowing for example to build channels with an increasing or decreasing width, with curved or angled geometries, or with special engineered nozzles or funnels at their beginning or their end, for example a nozzle at the outlet and a funnel at the inlet. The high aspect ratios of the channels allow for an equal pressure distribution to the droplet makers, resulting in a high efficiency of droplet production, since almost all channels are actively producing droplets at the channel outlets. Furthermore, using the present invention, it is possible build a membrane over multiple tens of centimeters, without affecting the monodisperse droplet production over the entire membrane length, for example evenly producing droplets over an array length of 6 cm.

The device, which particularly consists of thousands of parallelized step emulsification droplet makers, is for example produced by soft lithography, etching and stacking up. The presented methodology, in contrast to conventional membrane production cycles, allows obtaining large aspect ratio channels combined with the implementation of any desired channel geometry at the end of the channels. Both those features are highly advantageous for precision control of monodispersity of droplets. Scaling up of the step emulsification channels allows producing monodisperse emulsions in the order of tons per year, bringing microfluidics closer to industrial applications.

Microfluidic step emulsification devices can be embedded in polymeric platforms such as for example in polydimethylsiloxane (PDMS) or polymethylmethacrylate (PMMA), or in metallic or ceramic materials. For example, it is possible to produce microfluidic step emulsification devices in glass. Such glass devices combine the thermal, chemical, and mechanical stability of the embedding material with the advantages given by step emulsification. Microfluidic glass chips are produced using a simple and efficient method comprising photolithographic and etching steps. Photolithography allows for implementing any desired channel geometry up to a resolution of 1-2 μm.

In certain embodiments, the front side and the back side extend perpendicular to the layers of the stack. Therein, in particular, in case the channels are parallel, the front side and the back side of the stack extend perpendicular to the longitudinal axis.

In certain embodiments, the channels are arranged at an angle of 60° to 120°, particularly 90°, in respect of the front side and the back side.

In certain embodiments, the channels are closed in a direction perpendicular to the extension of the layers.

In certain embodiments, each channel comprises a respective aspect ratio between a length of the respective channel along the longitudinal axis and a minimum cross-sectional extension perpendicular to the longitudinal axis (aspect ratio=length/minimum cross-sectional extension), wherein the aspect ratio is 30 or more, particularly 75 or more, more particularly 120 or more.

Therein, the aspect ratio is defined as the ratio between the channel length and the cross-sectional channel width or channel height, whichever is smaller (i.e. aspect ratio=channel length/channel width or aspect ratio=channel length/channel height). The channel width and channel height may also be equal to each other in some embodiments, for example in channels having a circular cross-section. In this case, the aspect ratio would be the ratio between the length and the diameter of the channel.

The cross-sectional extension may also vary along the length of the channel. In this case, the aspect ratio is defined as the ratio between the length and the minimum of the cross-sectional extension.

Furthermore, the channels of the device according to the invention may also extend along a curved or bent line, or may comprise at least one corner. In this case the length of the channel is measured along this entire curved, bent, or corned line.

In certain embodiments, the channels are microfluidic channels.

In certain embodiments, the aspect ratio is 30 to 20000, particularly 75 to 20000, more particularly 120 to 20000.

Despite the robustness against small pressure fluctuations, a similar pressure distribution at the droplet makers is desirable, since this allows for a nearly 100% working efficiency of all the droplet makers. For this reason, a high resistance of the distribution is required, which is determined by the aspect ratio of the channels. Through this high resistance, the pressure is similar at every droplet maker and all the parallelized droplet makers produce droplets at a frequency in the same range. The size of the outer continuous phase channel can range from multiple times the size of the distribution channel to infinity, since it is independent of the droplet size.

In certain embodiments, the device comprises 100 or more channels, particularly 1000 or more channels.

In certain embodiments, the stack comprises at least 10 layers. Stacking up and combining n layers of such a device in one entire device lead to a n-times higher production rate. For example, a particular single 2D array prototype produces monodisperse droplets at a maximum throughput of 12 ml/h, given a droplet diameter of 80 μm. By stacking-up 10 such layers, it is possible to produce droplets at a flow rate of 120 ml/h. The production rate strongly increases with increasing droplet diameter.

In certain embodiments, each of the channels comprises a nozzle positioned at the outlet of the respective channel, wherein the nozzle comprises a first maximum cross-sectional extension and wherein the respective channel comprises a second cross-sectional extension adjacent to the nozzle, wherein the first maximum cross-sectional extension is larger than the second cross-sectional extension. In other words: the channels spread at the nozzle, wherein in the cross-sectional extension increases at the nozzle.

In certain embodiments, the nozzles have a triangular shape when viewed in a cross-section parallel to the layers of the device.

In certain embodiments, the nozzles are wedge-shaped.

The droplets are formed by the following mechanism: The dispersed phase flows through the distribution channel to a nozzle, where at their end it gets emulsified. In particular, the nozzle is a triangular reservoir at the end of the distribution channels. The rapid liquid transfer from the nozzle to the continuous phase reservoir causes a narrow liquid neck formation. Rayleigh plateau instabilities occurring at the narrow neck leads to the droplet formation at the step of the nozzle (F. Dutka, A. S. Opalski, P. Garstecki, *Lab on a Chip* 2016, 16, 2044). When reaching the step at the end of the nozzle, the pressure gradient of the disperse phase in and outside of the nozzle detaches a droplet without external force. Such a nozzle is advantageous, as it decouples the flow rates from the emulsification process. A main advantage of step emulsification with a nozzle design over other emulsification techniques is the independence of the applied flow rate of the dispersed phase under a critical maximal flow rate. Additionally, the droplet size is also independent of the continuous flow conditions, even at stagnant flow conditions. In contrast, the mean droplet size mainly depends on the channel geometry. This property makes step emulsification attractive for parallelization, since small pressure fluctuations in the different channels do not affect the size distribution of the produced droplets.

A further advantage of the device according to the invention is the possibility to implement high aspect ratio channels and to combine them with a specialized geometry, as, for example, the triangular nozzle. The combination of the high aspect ratio channels together with the triangular nozzle at their end allows to decouple the droplet size from the applied flow rates and ensures an almost 100% working efficiency of the device.

In certain embodiments, each of the channels comprises a funnel positioned at the inlet of the respective channel, wherein the funnel comprises a second maximum cross-sectional extension and wherein the respective channel comprises a third cross-sectional extension adjacent to the funnel, wherein the second maximum cross-sectional extension is larger than the third cross-sectional extension.

In certain embodiments, the funnels have a triangular shape when viewed in a cross-section parallel to the layers of the device.

In certain embodiments, the funnels are wedge-shaped.

In certain embodiments, the channels are parallel.

In certain embodiments, the cross-sectional extension (i.e. the diameter) of the channels is 200 μm or less, particularly 50 μm or less, more particularly 25 μm or less, most particularly 10 μm or less.

In certain embodiments, the device further comprises a first reservoir or conduit which is in flow connection with the inlets of the channels and a second reservoir or conduit which is in flow connection with the outlets of the channels.

In certain embodiments, the device comprises at least one additional reservoir or conduit, wherein the device comprises a plurality of first channels connecting the first reservoir or conduit to the at least one additional reservoir or conduit, and wherein the device comprises a plurality of second channels connecting the at least one additional reservoir or conduit to the second reservoir or conduit.

The device according to the present invention allows for the emulsification in open reservoir systems, in closed flowing systems or, if combined in series, for the generation of multiple emulsions. In particular, the device is fed with the dispersed phase over a single external force. This forces the fluid, a liquid or a gas, to reach the outlets at the end of the channels of the device, where it gets emulsified. The liquid or gaseous droplets can be carried away due to gravity in an open reservoir with a stagnant continuous phase.

Depending on a heavier or a lighter dispersed phase density compared to the continuous phase, the entire system can be mounted upside down or bottom-up. If a rapid transportation of the emulsion is required, the devices can be mounted into a closed flowing system, in which the continuous phase is flowed around, collects the produced droplets and transports them over an outlet to a collection chamber.

Combining two devices in series allows for the production of double emulsions. Double emulsions are droplet within droplets, which are highly attractive for the production of microcapsules as protection of the inner phase. Here, the first device produces single emulsions, which are then directly re-injected into the second device, where the second emulsification step occurs.

A second aspect of the invention relates to a method for generating droplets of a dispersed phase in a continuous phase using a device according to the first aspect, wherein a flow of the dispersed phase from the inlets through the outlets of the channels into the continuous phase is provided, and wherein a plurality of droplets of the dispersed phase is formed in the continuous phase.

In certain embodiments, the dispersed phase is provided in the first reservoir or conduit, wherein the continuous phase is provided in the second reservoir or conduit, and wherein a flow of the dispersed phase through the channels into the continuous phase is generated.

In certain embodiments, a flow of a dispersed inner phase from inlets through respective outlets of a plurality of first channels of the device into a dispersed middle phase is provided, wherein a plurality of first droplets of the dispersed inner phase is formed in the dispersed middle phase, and wherein a flow of the dispersed middle phase containing the first droplets from inlets through respective outlets of a plurality of second channels of the device into the continuous phase is provided, wherein a plurality of second droplets of the dispersed inner phase and the dispersed middle phase is formed in the continuous phase.

In certain embodiments, a dispersed inner phase is provided in the first reservoir or conduit, wherein at least one dispersed middle phase is provided in the at least one additional reservoir or conduit, and wherein a flow of the dispersed inner phase through the first channels into the at least one dispersed middle phase is generated, and wherein a flow of the at least one dispersed middle phase through the second channels into the continuous phase is generated.

Advantageously, this allows to produce double emulsions.

A third aspect of the invention relates to a method for fabricating a device according to the first aspect, wherein a plurality of layers of a substrate material is provided, and wherein a plurality of grooves is generated in a respective first side of each layer, and wherein a stack is formed from the layers, such that said first side of each respective layer contacts a respective second side of an adjacent layer, such that the plurality of channels is formed, wherein the layers of the stack are connected, particularly bonded to each other.

In certain embodiments, the grooves in the first sides of the layers are generated by means of photolithography and subsequent etching.

The device according to the invention can be realized for example as a photolithographically etched, stacked up membrane with high aspect ratio channels. A first step of the respective fabrication method consists of producing multiple, individual 2D-arrays of linearly parallelized step emulsification channels with a high aspect ratio and a nozzle, for example a triangular nozzle. In a second step, those arrays are vertically stacked-up and hermetically-sealed in a bonder aligner at high temperatures. Following those ideas, a device according to the invention can be produced using photolithography, wet-etching, stacking, and bonding in glass.

The invention is further described by the following examples and figures, from which additional embodiments may be drawn.

Figure 1:
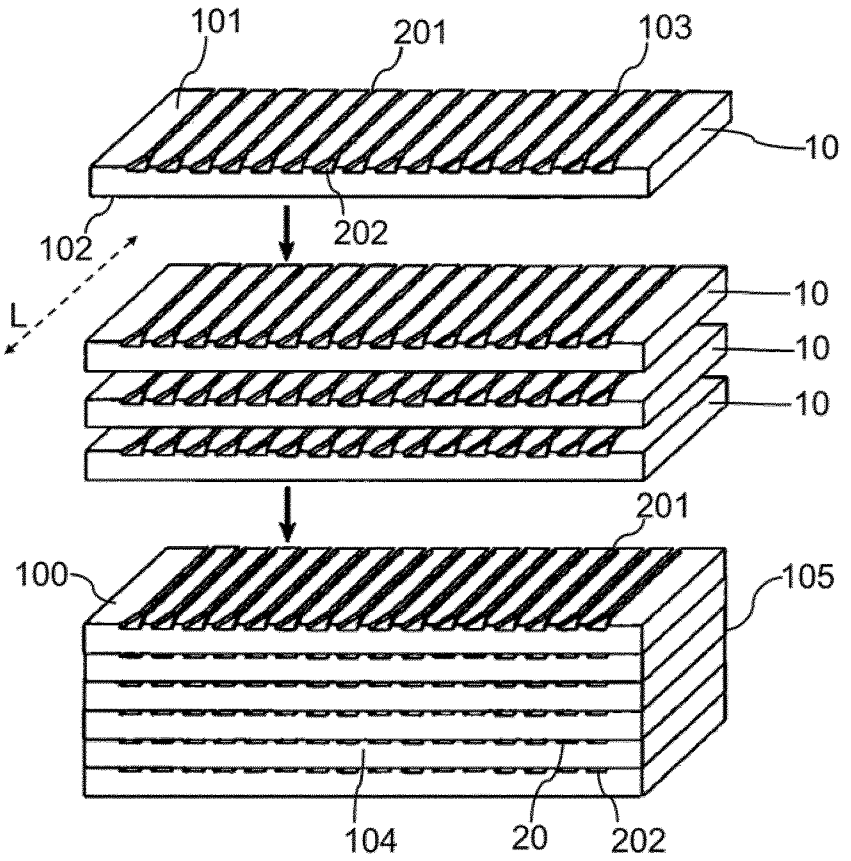
FIG. 1 shows a perspective view of a part of a device according to the invention comprising a stack of layers comprising channels.

FIG. 1 shows a perspective view of a part of a device 1 according to the invention comprising a stack of layers 10 comprising channels 20. The layers 10 constitute individual arrays of parallelized distribution channels 20. As illustrated in FIG. 1, the layers 10 can be stacked-up and bonded (for example thermally) for the production of a three-dimensional device 1 resulting in a microfluidic brush emulsifier.

Therein, the layers 10 each comprise a first side 101 comprising recesses 103, and a second side 102 opposing the first side 101. In the stack 100, the first side 101 of each layer 10 is covered by a second side 102 of an adjacent layer 10 stacked on top of the layer 10. As a result, the recesses 103 are covered by the second side 102, such that the channels 20 are formed.

The final stack 100, obtained by stacking and connecting the layers 10, comprises a front side 104 and a back side 105, perpendicular to the layers 10 and in the depicted embodiment also perpendicular to the longitudinal axis L, that is perpendicular to the extension of the channels 20. Inlets 201 of the channels 20 are positioned on the back side 105, and outlets 202 of the channels 20 are positioned on the front side 104.

Figure 2:
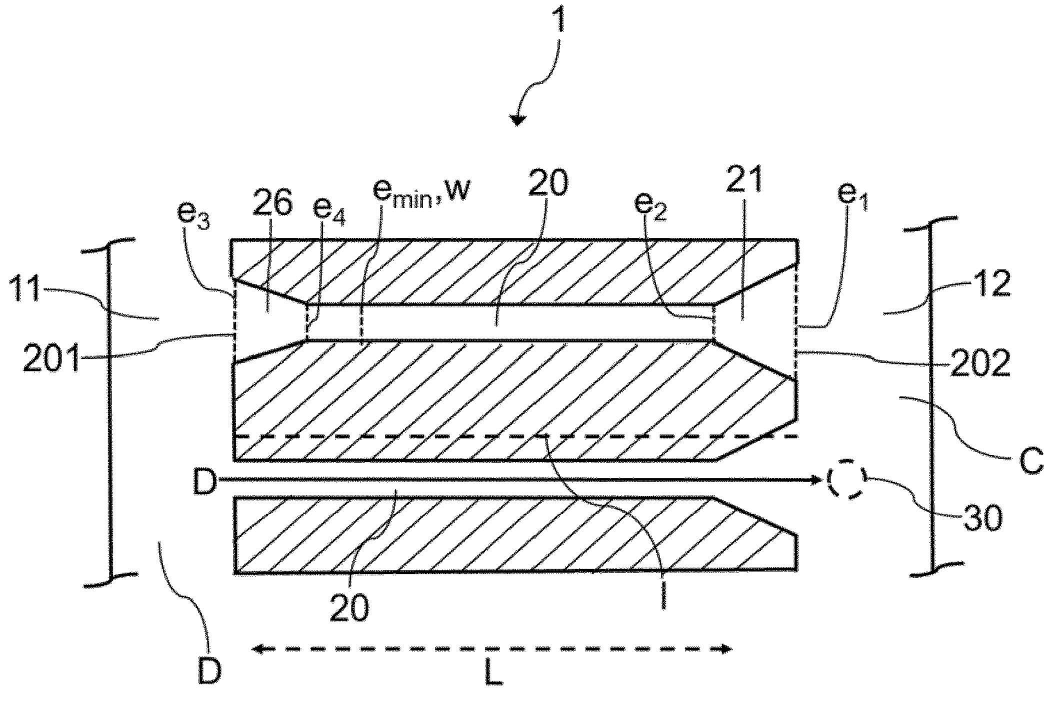
FIG. 2 shows a schematic representation of a device according to the invention.

FIG. 2 shows a cross-sectional view of a layer 10 (see FIG. 1) of a device 1 for generating droplets 30 of a dispersed phase D in a continuous phase C according to the present invention. The device 1 is connected to a first reservoir 11 (for example in case of an open reservoir system) or first conduit 11 (for example in case of a closed flowing system) which is in flow connection with a second reservoir 12 (for example in case of an open reservoir system) or second conduit 12 (for example in case of a closed flowing system) by means of a plurality of channels 20 of the device 1. For simplicity, only two channels 20 are depicted in FIG. 2, but the number of channels 20 may be much higher (see also FIG. 1), for example several thousand.

The channels 20 extend from respective inlets 201 along a respective longitudinal axis L to respective outlets 202. According to the embodiment depicted in FIG. 2, the channels 20 are parallel to each other. However, other embodiments are possible within the scope of the present invention, in which the channels 20 are non-parallel and/or have different shapes (for example are bent or curved).

Furthermore, the channels 20 have a respective length l along the longitudinal axis L and a minimum cross-sectional extension $e_{min}$ perpendicular to the longitudinal axis L, which is equal to the width w in the depicted example, wherein the width w extends in the plane of the respective layer 10, perpendicular to the longitudinal axis L.

In other embodiments, the minimum cross-sectional extension $e_{min}$ may be equal to a height h of the respective channel 20, wherein the height h is measured along a direction which is perpendicular to the width w and the longitudinal axis L. The width w may also be equal to the height h in some embodiments. An aspect ratio a of the channels 20 is defined as the ratio of the length l and the minimum cross-sectional extension $e_{min}$ (in this case the width w).

In the embodiment depicted in FIG. 2, the channels 20 comprise a section, in which the cross-sectional extension is constant (equal to the minimum cross-sectional extension $e_{min}$), and a nozzle 21 positioned at or near the respective outlet 202, in which the cross-sectional extension increases. The nozzle 21 is in flow connection with the second reservoir or conduit 12 and comprises a first maximum cross-sectional extension $e_1$ perpendicular to the longitudinal axis L, and a second cross-sectional extension $e_2$ adjacent to the nozzle 21, that is at the connection between the nozzle 21 and the remaining channel 20, wherein the first maximum cross-sectional extension $e_1$ is larger than the second cross-sectional extension $e_2$. In the example shown in FIG. 2, the nozzle 21 is wedge-shaped (see also description of FIG. 5A). Other examples of shapes are depicted in FIGS. 5B to 5H.

When a dispersed phase D, for example a hydrophobic substance such as an oil, is provided in the first reservoir or conduit 11, a continuous phase C, for example an aqueous phase, is provided in the second reservoir or conduit 12, and a pressure difference is provided between the first reservoir or conduit 11 and the second reservoir or conduit 12 (the dispersed phase D in the first reservoir or conduit 11 having a greater pressure than the continuous phase C in the second reservoir or conduit 12), a flow of the dispersed phase D through the channels 20 from the inlets 201 to the outlets 202 is generated, and droplets 30 of the dispersed phase D are formed at or near the respective outlets 202 upon mixing of the dispersed phase D and the continuous phase C at the connection or in the vicinity of the connection between the channels 20 and the second reservoir or conduit 12, that is at or in the vicinity of the respective outlets 202.

When nozzles 21 are present at the outlets 202 of the channels 20, the rapid liquid transfer from the nozzle 21 to the second reservoir or conduit 12 causes a narrow liquid neck formation, and Rayleigh plateau instabilities occurring at the narrow neck lead to droplet 30 formation at the step of the nozzle 21. This mechanism advantageously uncouples droplet 30 size from flow rate of the dispersed phase D.

Without wishing to be bound by theory, due to the high aspect ratio a (thus due to the great length of the channels 20 compared to their width w and/or height h), the flow resistance of the channels 20 is high enough to generate a flow of the dispersed phase D in almost all channels 20, such that droplets 30 are formed by almost all channels 20. This advantageously increases the amount of droplets 30 produced per unit of time. When using channels 20 of lower aspect ratio a, such as in devices of the prior art, only a small fraction of the channels 20 generate droplets 30 as a result of a heterogeneous pressure distribution of the dispersed phase D.

Figure 3:
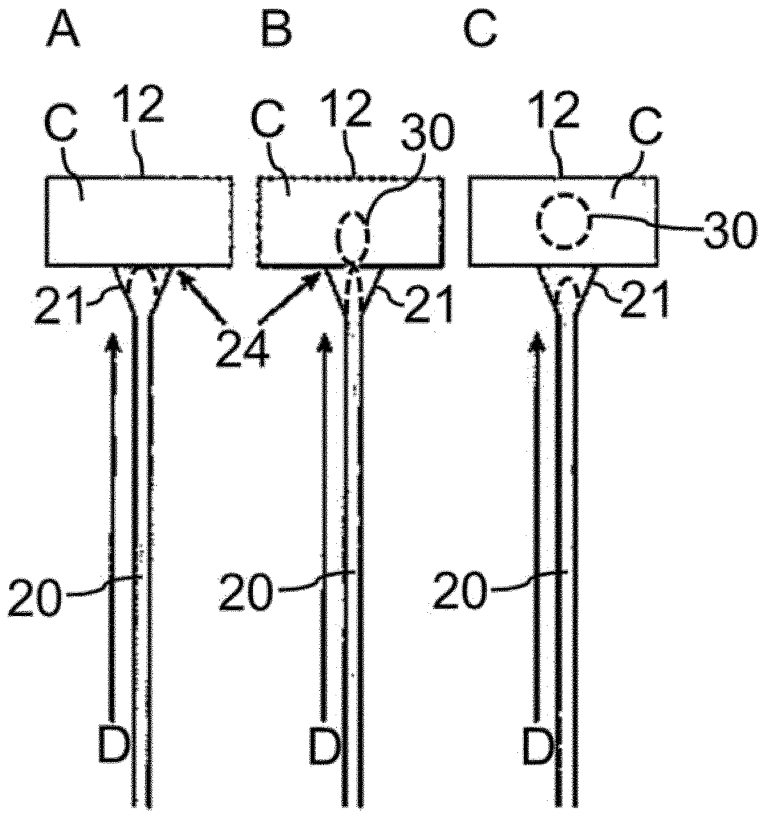
FIG. 3 shows a schematic of the formation of a droplet in a channel of the device according to the invention.

FIG. 3 schematically illustrates the formation of a droplet 30 in the nozzle 21 of the channels 20. As shown, the dispersed phase D is flowed through the shallow distribution channel 20 over a wedge-shaped nozzle 21 to the second reservoir or conduit 12 containing the continuous phase C. The distribution channel 20 has a high aspect ratio a (ratio between length l and height h in this case).

The working principle of the device 1 according to the invention is step emulsification, in which the dispersed phase D is flowing to the nozzle 21 (FIG. 3A), drawn out over a step 24 into the second reservoir or conduit 12 due to a Laplace pressure difference between the nozzle and the continuous phase reservoir (FIG. 3B), and finally emulsification (FIG. 3C).

Figure 4:
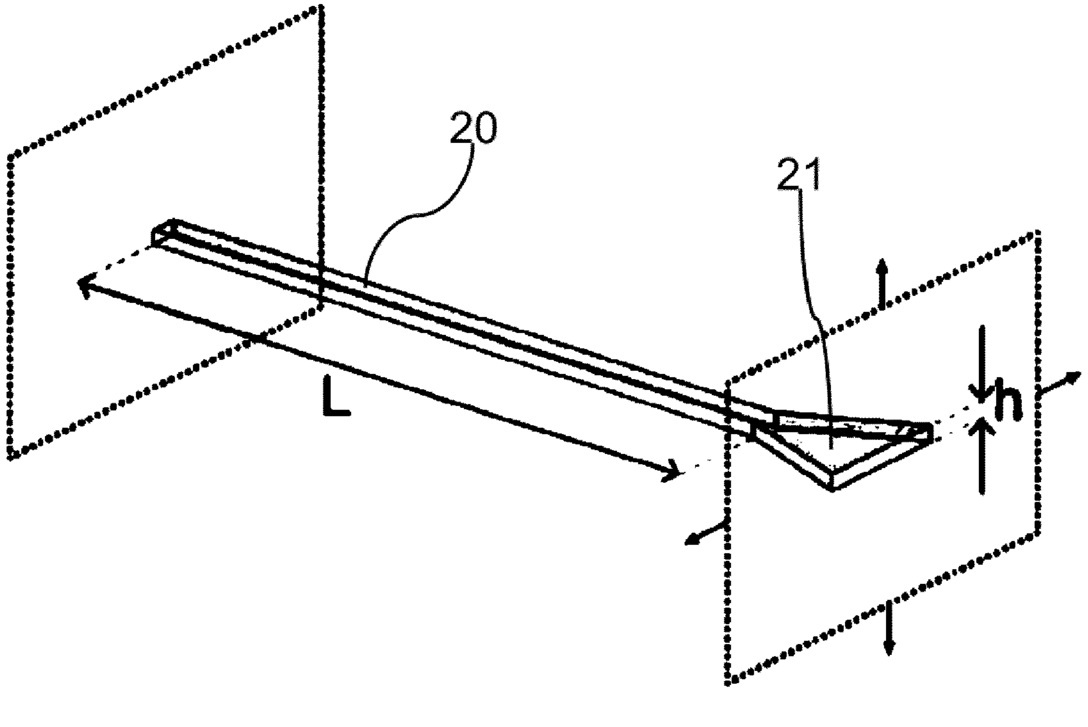
FIG. 4 shows a perspective view of a channel of the device according to the invention.

FIG. 4 shows a perspective view of an example of a channel 20 of the device 1 according to the invention. The channel 20 has a rectangular cross-section in respect of the longitudinal axis L, wherein the height h is the minimal cross-sectional extension $e_{min}$. The channel 20 further comprises a wedge-shaped nozzle 21.

Figure 5:
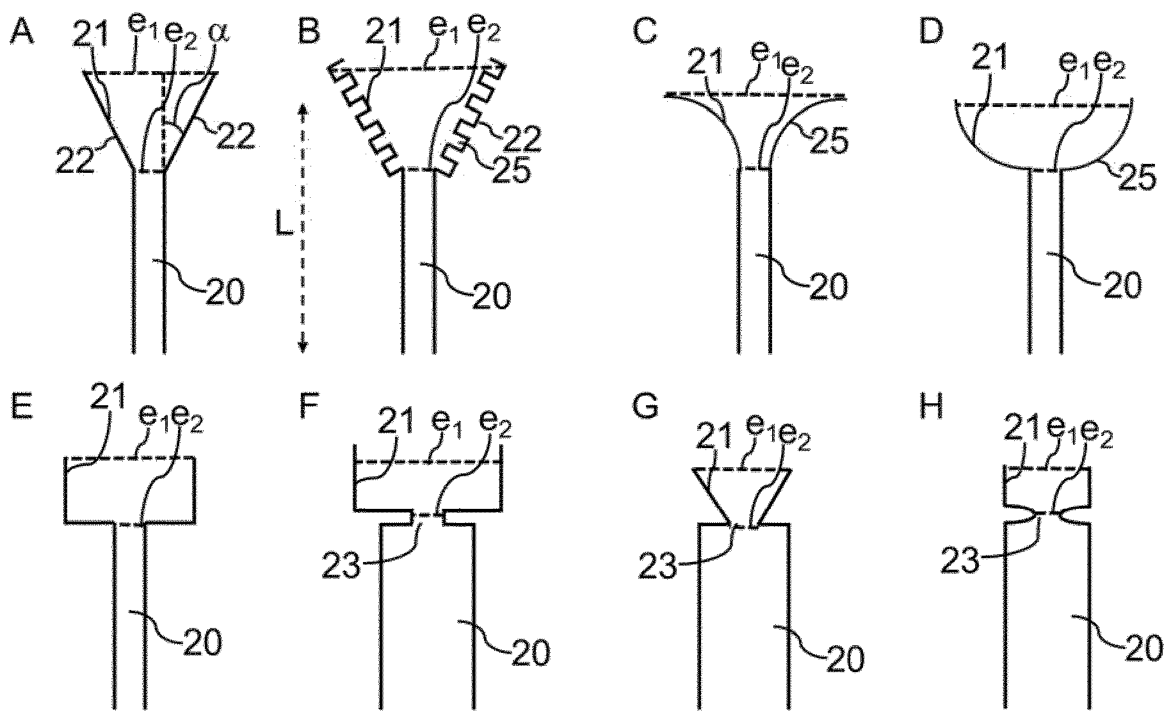
FIG. 5 shows different embodiments of channels of the device according to the invention comprising nozzles of different geometries.

FIG. 5 depicts schematic representations of different configurations of the nozzle 21 of the channels 20, wherein the respective first maximal cross-sectional extensions $e_1$ and the respective second cross-sectional extensions $e_2$ are indicated (see description of FIG. 2 for further details).

FIG. 5A shows a wedge-shaped nozzle 21, which is limited by straight walls 22, which are arranged at an angle $\alpha$ in respect of the longitudinal axis L, along which the channel 20 extends. For example, the angle $\alpha$ may be 5° to 50°. FIG. 5B shows a nozzle 21 limited by walls 22 comprising grooves 25. FIGS. 5C and 5D depict nozzles 21 limited by curved walls 22, wherein the inner walls form a convex shape in the nozzle 21 shown in FIG. 5C and a concave shape in the nozzle 21 illustrated in FIG. 5D. FIG.

5E shows a nozzle 21 with a rectangular cross-section. FIGS. 5F to 5H depict nozzles 21 comprising respective constrictions 23 having the second cross-sectional extension $e_2$, wherein the cross-sectional extension at the constriction 23 is reduced compared to the section of the channel 20 adjacent to the nozzle 21.

Figure 6:
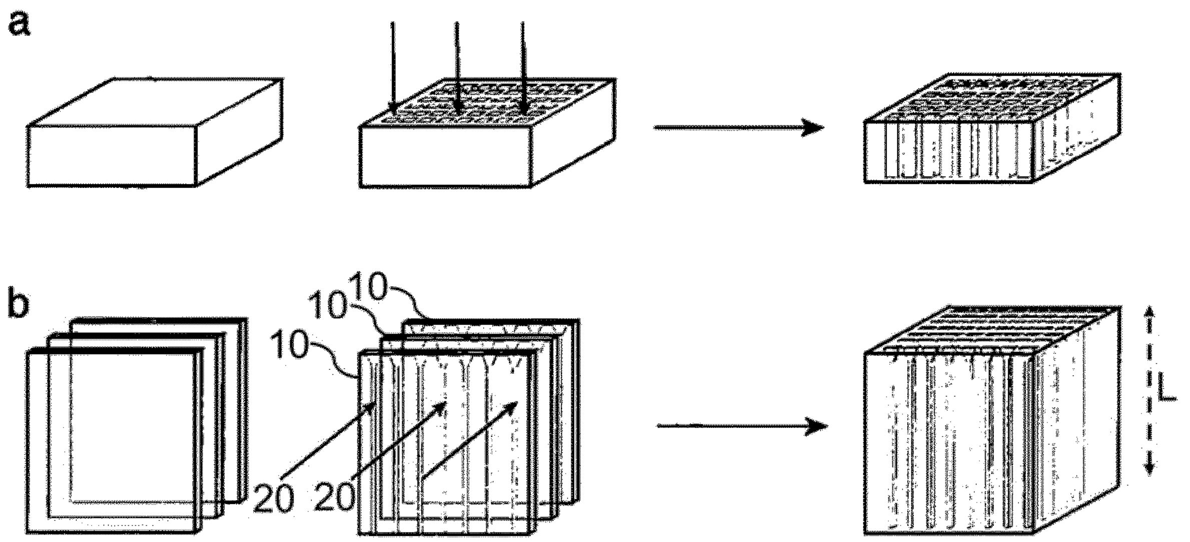
FIG. 6 shows a schematic representation of manufacturing processes of parts of devices according to the prior art (a) and the present invention (b)

FIG. 6 shows a comparison of fabrication methods of the device 1 according to the invention by the method according to the invention over conventional methods of the prior art. As depicted in FIG. 6*a*, conventionally produced devices for generation of droplets are for example processed by drilling, lasering or etching a bulk material. This limits the device to straight holes with a low aspect ratio a.

In contrast, the fabrication method according to the present invention (in particular using lithography) allows to implement high aspect ratio a channels 20 with a special channel 20 geometry, since multiple layers 10 are individually processed, stacked-up and connected, particularly bonded together.

Figure 7:
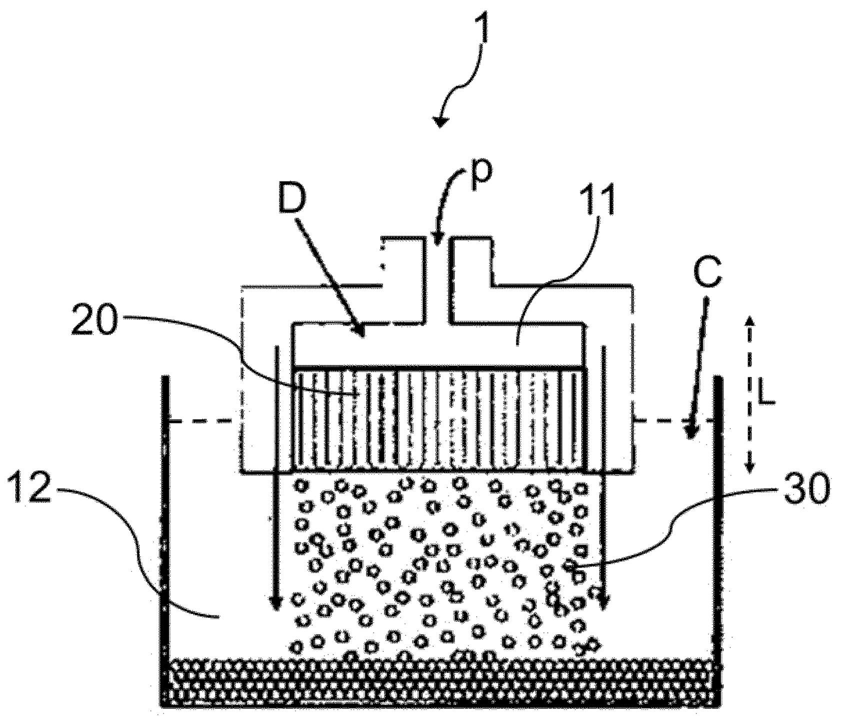
FIG. 7 shows an embodiment of the device according to the invention designed as an open reservoir system.
Figure 8:
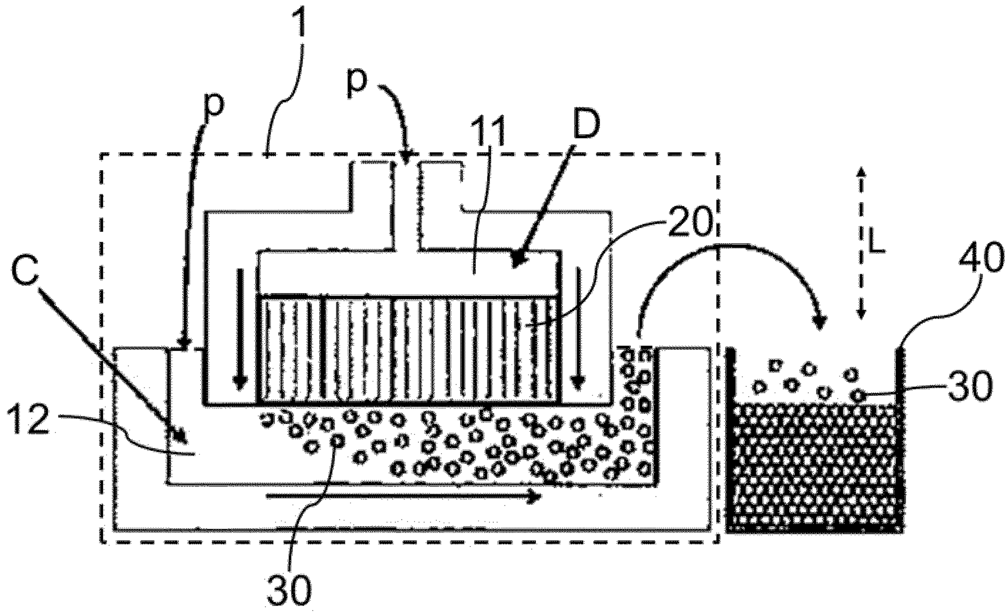
FIG. 8 shows an embodiment of the device according to the invention designed as a closed flowing system.
Figure 9:
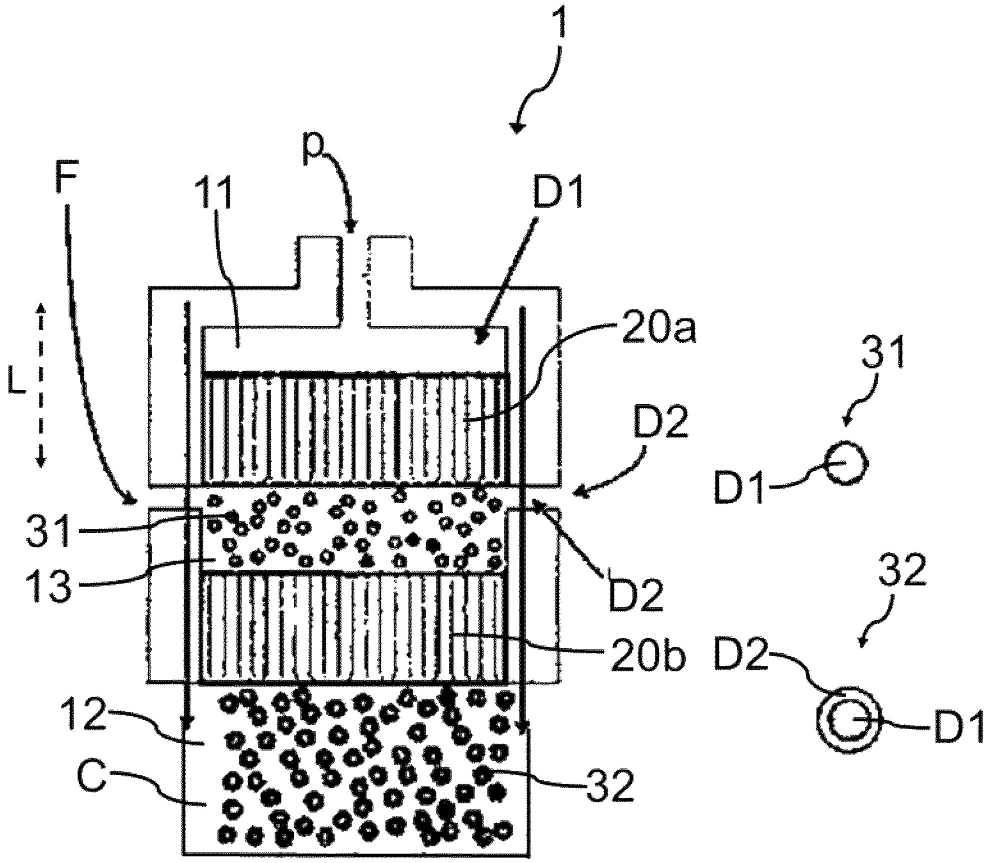
FIG. 9 shows an embodiment of the device according to the invention adapted for double emulsion generation.

FIGS. 7 to 9 illustrate different possibilities to use the device 1 according to the invention.

FIG. 7 shows a device 1 according to the invention, wherein the second reservoir or conduit 12 is an open second reservoir 12 containing the continuous phase C. When an external pressure p is applied to the first reservoir or conduit 11 of the device 1, for example by means of a pump, such as a syringe pump or a pressure pump, the dispersed phase D is forced through the channels 20 of the device 1, producing droplets 30 upon mixing with the continuous phase C. The produced droplets 30 are carried away from the channel 20 exits to the bottom of the second reservoir 12 by gravity.

FIG. 8 shows a closed system with a flowing continuous phase C. Therein, an external pressure p is applied both to the first reservoir or conduit 11, and to the second reservoir or conduit 12, such that a respective flow of both the dispersed phase D and the continuous phase C is generated. Similar to the setup of FIG. 7, the dispersed phase D flows through the channels 20 of the device 1 (parts enclosed by the dashed line) and forms droplets 30 upon mixing with the continuous phase C, wherein the produced droplets 30 are flowing within the continuous phase 30 and are collected in an external reservoir 40.

FIG. 9 shows a device 1 for the production of multiple emulsions comprising a first reservoir or conduit 11, an additional reservoir or conduit 13, and a second reservoir or conduit 12, wherein the first reservoir or conduit 11 is connected to the additional reservoir or conduit 13 by means of first channels 20*a*, and wherein the additional reservoir or conduit 13 is connected to the second reservoir or conduit 12 by means of second channels 20*b*. Such a system can be realized by combining multiple brush emulsifiers in series.

As an example, the idea of double emulsion production is shown, where the first produced single emulsions are reinjected into the second brush emulsifier and the double emulsions are formed.

Therein, a dispersed inner phase D1 is provided in the first reservoir or conduit 11, flowed through the first channels 20*a* and mixed with a dispersed middle phase D2 in the additional reservoir or conduit 13, forming first droplets 31. The dispersed middle phase D2 comprising the first droplets 31 is therefore a single emulsion of the dispersed inner phase D1 in the dispersed middle phase D2. This single emulsion is flowed through the second channels 20*b* and mixed with the continuous phase C in the second reservoir or conduit 12. Thereby, second droplets 32 of the dispersed inner phase D1 surrounded by the dispersed middle phase D2 are formed in the continuous phase C, constituting a double emulsion.

A device 1 for the production of multiple emulsions may also be realized as a closed system with a flowing continuous phase C and/or a flowing dispersed middle phase D2, for example by applying an external pressure to the first reservoir or conduit 11 and/or the additional reservoir or conduit 13, such that a respective flow of the continuous phase C or the dispersed middle phase D2 is generated.

LIST OF REFERENCE SIGNS

| | |
|---|---|
| Device for generating droplets | 1 |
| Layer | 10 |
| First reservoir or conduit | 11 |
| Second reservoir or conduit | 12 |
| Additional reservoir or conduit | 13 |
| Channel | 20 |
| First channel | 20a |
| Second channel | 20b |
| Nozzle | 21 |
| Wall | 22 |
| Constriction | 23 |
| Step | 24 |
| Groove | 25 |
| Funnel | 26 |
| Droplet | 30 |
| Single emulsion droplet | 31 |
| Double emulsion droplet | 32 |
| External reservoir | 40 |
| Stack | 100 |
| First side | 101 |
| Second side | 102 |
| Groove | 103 |
| Front side | 104 |
| Back side | 105 |
| Inlet | 201 |
| Outlet | 202 |
| Longitudinal axis | L |
| Length | l |
| Width | w |
| Height | h |
| Minimum cross-sectional extension | $e_{min}$ |
| First maximum cross-sectional extension | $e_1$ |
| Second cross-sectional extension | $e_2$ |
| Aspect ratio | a |
| Dispersed phase | D |
| Continuous phase | C |
| Dispersed inner phase | D1 |
| Dispersed middle phase | D2 |
| Pressure | p |
| Angle | α |

The invention claimed is:

1. A device (1) for generating droplets (30) of a dispersed phase (D) in a continuous phase (C), comprising a plurality of channels (20), wherein each channel (20) comprises an inlet (201) and an outlet (202), and wherein each channel (20) extends from said inlet (201) along a respective longitudinal axis (L) to said outlet (202), so that droplets (30) of a dispersed phase (D) can be generated in a continuous phase (C) at said outlets (202) when a flow of said dispersed phase (D) from said inlets (201) to said outlets (202) is provided and said outlets (202) are in flow connection with a reservoir or conduit containing said continuous phase (C), characterized in that said device (1) comprises a plurality of layers (10) of a substrate material arranged in a stack (100), wherein each layer (10) comprises a first side (101) and a second side (102), wherein the first side (101) faces away from the second side (102), and wherein the first side (101) of each layer (10) comprises a plurality of grooves (103), wherein the grooves (103) of each first side (101) are covered by a second side (102) of an adjacent layer (10), such that said plurality of channels (20) is formed, wherein the inlets (201) are arranged on a front side (104) of the stack (100) and the outlets (202) are arranged on an opposing back side (105) of the stack (100), wherein each of the channels (20) comprises a nozzle (21) ending with the respective outlet (202), the outlet (202) comprising a first maximum cross sectional extension ($e_1$) of the nozzle (21), and wherein the respective channel (20) comprises a second cross-sectional extension ($e_2$) adjacent the respective nozzle (21), wherein said first maximum cross-sectional extension ($e_1$) is larger than said second cross-sectional extension ($e_2$).

2. The device (1) according to claim 1, characterized in that said front side (104) and said back side (105) extend perpendicular to the layers (10) of the stack (100).

3. The device (1) according to claim 1, characterized in that each channel (20) comprises a respective aspect ratio (a) between a length (I) of the respective channel (20) along said longitudinal axis (L) and a minimum cross-sectional extension ($e_{min}$) perpendicular to said longitudinal axis (L), wherein said aspect ratio (a) is one of: at least 30, at least 75, or at least 120.

4. The device (1) according to claim 1, characterized in that said aspect ratio (a) is one of: 30 to 20000, 75 to 20000, or 120 to 20000.

5. The device (1) according to claim 1, characterized in that the device (1) comprises one of: at least 100 channels (20) or at least 1000 channels (20).

6. The device (1) according to claim 1, characterized in that said stack (100) comprises at least 10 layers (10).

7. The device (1) according to claim 1, characterized in that the channels (20) are parallel.

8. The device (1) according to claim 1, characterized in that the cross-sectional extension of the channels (20) is one of: 200 μm or less, 50 μm or less, 25 μm or less, or 10 μm or less.

9. The device (1) according to claim 1, characterized in that the device (1) further comprises a first reservoir or conduit (11) which is in flow connection with said inlets (201) of said channels (20) and a second reservoir or conduit (12) which is in flow connection with said outlets (202) of said channels (20).

10. The device (1) according to claim 9, characterized in that said device (1) comprises at least one additional reservoir or conduit (13), wherein said device (1) comprises a plurality of first channels (20*a*) connecting said first reservoir or conduit (11) to said at least one additional reservoir or conduit (13), and wherein said device (1) comprises a plurality of second channels (20*b*) connecting said at least one additional reservoir or conduit (13) to said second reservoir or conduit (12).

11. A method for generating droplets (30) of a dispersed phase (D) in a continuous phase (C) comprising providing a device (1) according to claim 1, wherein a flow of said dispersed phase (D) from said inlets (201) through said outlets (202) of said channels (20) into said continuous phase (C) is provided, and wherein a plurality of droplets (30) of said dispersed phase (D) is formed in said continuous phase (C).

12. The method according to claim 11, wherein a flow of a dispersed inner phase (D1) from inlets (201) through respective outlets (202) of a plurality of first channels (20*a*) of the device (1) into a dispersed middle phase (D2) is provided, wherein a plurality of first droplets (31) of the dispersed inner phase (D1) is formed in the dispersed middle phase (D2), and wherein a flow of the dispersed middle phase (D2) containing said first droplets (31) from inlets (201) through respective outlets (202) of a plurality of second channels (20*b*) of the device (1) into said continuous phase (C) is provided, wherein a plurality of second droplets (32) of said dispersed inner phase (D1) and said dispersed middle phase (D2) is formed in said continuous phase (C).

13. A method for fabricating a device (1) according to claim 1, wherein a plurality of layers (10) of a substrate material is provided, and wherein a plurality of grooves (103) is generated in a respective first side (101) of each layer (10), and wherein a stack (100) is formed from said layers (10), such that said first side (101) of each respective layer (10) contacts a respective second side (102) of an adjacent layer (10), such that said plurality of channels (20) is formed, wherein said layers (10) of said stack (100) are connected, particularly bonded to each other.

14. The method according to claim 13, wherein said grooves (20) in said first sides (101) of said layers (10) are generated by means of photolithography and subsequent etching.

* * * * *